US012172881B2

(12) United States Patent
Figa

(10) Patent No.: US 12,172,881 B2
(45) Date of Patent: *Dec. 24, 2024

(54) ROTATING LID OPENER

(71) Applicant: Romek Figa, Hanover, MA (US)

(72) Inventor: Romek Figa, Hanover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,778

(22) Filed: Apr. 4, 2023

(65) Prior Publication Data

US 2024/0132336 A1 Apr. 25, 2024
US 2024/0228252 A9 Jul. 11, 2024

Related U.S. Application Data

(63) Continuation of application No. 17/972,201, filed on Oct. 24, 2022, now Pat. No. 11,649,149.

(51) Int. Cl.
*B67B 7/14* (2006.01)
*B67B 7/18* (2006.01)

(52) U.S. Cl.
CPC . *B67B 7/14* (2013.01); *B67B 7/18* (2013.01)

(58) Field of Classification Search
CPC ................ B67B 7/12; B67B 7/14; B67B 7/18
See application file for complete search history.

(56) References Cited

U.S. PATENT DOCUMENTS 1,638,185 A * 8/1927 Andrew .................... B67B 7/18 7/152
1,894,556 A * 1/1933 Edlund .................... B67B 7/18 24/524
1,943,611 A * 1/1934 Johnson .................... B67B 7/18 294/16
2,078,750 A * 4/1937 Bernesser ................. B67B 7/18 D8/40
2,478,471 A * 8/1949 Edlund ..................... B67B 7/18 81/3.33
2,499,032 A * 2/1950 Niblett .................... B25B 5/147 269/215
2,507,789 A * 5/1950 Jessup ....................... B67B 7/18 81/391
2,521,011 A * 9/1950 Hoskins .................... B67B 7/18 81/3.42
3,795,158 A 3/1974 Morita
4,033,205 A * 7/1977 Hoskins .................... B67B 7/18 81/3.42
4,052,917 A * 10/1977 Gee ......................... B25B 13/20 81/185.1
4,306,470 A * 12/1981 Woloszyn ................. B67B 7/18 81/128

(Continued)

*Primary Examiner* — David B. Thomas
(74) *Attorney, Agent, or Firm* — Sunstein LLP

(57) ABSTRACT

A rotating lid opener for removing screw lids includes non-slip elements (e.g., non-slip pads) on the underside of the device at locations that will engage with the top surface of the lid, thereby providing additional adhesion or friction when the handle is being rotated to reduce the chance of the device rotating without the jaws locking onto the lid. The non-slip elements can be made of any appropriate non-slip material (e.g., rubber, foam, sponge, cork, fabric, plastic, silicone, elastic, adhesive, etc.) and/or be configured to enhance grip (e.g., patterned, coated, etc.). Among other things, these non-slip elements will facilitate one-hand operation of the device.

10 Claims, 7 Drawing Sheets

(56) References Cited

U.S. PATENT DOCUMENTS

| | | | | |
|---|---|---|---|---|
| 6,854,361 | B2 * | 2/2005 | Vandergaw | B67B 7/18 81/3.4 |
| 7,024,965 | B2 | 4/2006 | Tremblay | |
| 7,100,473 | B2 * | 9/2006 | Hefti | B67B 7/18 81/3.4 |
| 7,367,248 | B2 * | 5/2008 | Ruffner | B67B 7/18 81/3.44 |
| 10,464,794 | B2 * | 11/2019 | Figa | F16B 2/185 |
| 11,472,686 | B2 * | 10/2022 | Figa | B67B 7/14 |
| 11,649,149 | B1 * | 5/2023 | Figa | B67B 7/14 81/3.36 |
| 11,691,860 | B2 * | 7/2023 | Elzinga | B67B 7/44 81/3.2 |
| D1,021,586 | S * | 4/2024 | Merrill | D8/40 |
| 2017/0283231 | A1 * | 10/2017 | Figa | B67B 7/18 |
| 2017/0284596 | A1 * | 10/2017 | Figa | F16B 2/10 |
| 2018/0044156 | A1 * | 2/2018 | Jacobs | B67B 7/14 |
| 2020/0331738 | A1 * | 10/2020 | Figa | B67B 7/18 |
| 2021/0087038 | A1 * | 3/2021 | Figa | B67B 7/14 |
| 2022/0348451 | A1 * | 11/2022 | Figa | B67B 7/14 |

* cited by examiner

ROTATING LID OPENER

CROSS-REFERENCE TO RELATED APPLICATION(S)

This patent application is a continuation of U.S. patent application Ser. No. 17/972,201 entitled ROTATING LID OPENER WITH NON-SLIP ELEMENT(S) filed Oct. 24, 2022, which is hereby incorporated herein by reference in its entirety.

The subject matter of this patent application may be related to the subject matter of U.S. patent application Ser. No. 16/831,207 entitled TWO-HANDLED ROTATING LID OPENER filed Mar. 26, 2020 and published Oct. 22, 2020 as US 2020/0331738, which claims the benefit of U.S. Provisional Patent Application No. 62/836,296 entitled TWO-HANDLED ROTATING LID OPENER filed Apr. 19, 2019, each of which is hereby incorporated herein by reference in its entirety.

The subject matter of this patent application also may be related to U.S. patent application Ser. No. 15/296,479 entitled Apparatus and Method For Gripping a Container During Lid Opening filed Oct. 18, 2016 and published as U.S. Patent Application Publication No. US 2017/0283231 on Oct. 5, 2017 (now U.S. Pat. No. 10,464,794 issued Nov. 5, 2019) and to U.S. patent application Ser. No. 15/296,502 entitled Apparatus and Method For Gripping a Container For Lid Opening filed Oct. 18, 2016 and published as U.S. Patent Application Publication No. US 2017/0284596 on Oct. 5, 2017, each of which is hereby incorporated herein by reference in its entirety.

The subject matter of this patent application also may be related to U.S. patent application Ser. No. 17/867,064 entitled APPARATUS AND METHOD FOR GRIPPING A CONTAINER filed Jul. 18, 2022, which is a continuation of U.S. patent application Ser. No. 17/014,529 entitled APPARATUS AND METHOD FOR GRIPPING A CONTAINER filed Sep. 8, 2020 and published as U.S. Patent Application Publication No. US 2021/0087038 on Mar. 25, 2021 (now U.S. Pat. No. 11,472,686 issued Oct. 18, 2022), which claims the benefit of U.S. Provisional Patent Application No. 62/905,693 entitled APPARATUS AND METHOD FOR GRIPPING A CONTAINER filed Sep. 25, 2019 and claims the benefit of U.S. Provisional Patent Application No. 62/913,456 entitled APPARATUS AND METHOD FOR GRIPPING A CONTAINER filed Oct. 10, 2019, each of which is hereby incorporated herein by reference in its entirety

FIELD OF THE INVENTION

The invention generally relates to a device that facilitates removal of a screw lid from a jar.

BACKGROUND OF THE INVENTION

U.S. Pat. No. 1,894,556 to Edlund discloses a device that facilitates removal of a screw lid (also referred to as a top or screw top) from a container (e.g., a jar), specifically by allowing a user to secure the device onto the screw lid by rotating a handle until two clamping jaws engage with the screw lid, and then, while holding the container with one hand, to use the device with the other hand to twist off the screw lid. These types of devices continue to be sold today in virtually the identical form. For example, FIG. 1 shows two products that were available for purchase from www.amazon.com on Oct. 20, 2022. FIG. 2 shows a similar, but more modern, product that was available for purchase from www.kitchendao.com on Oct. 20, 2022.

These types of devices generally include a base member (sometimes referred to as a "flank") provided with guides; a shaft rotatably mounted at an inner end in the base member; a handle at the outer end of the shaft for rotating said shaft relative to the base member; a tooth wheel at the inner end of the shaft; and two U-shaped members provided with lid-gripping jaws slidably mounted in the guides, one arm of each U-shaped member having teeth meshing with the teeth of the wheel, the toothed arms being located upon opposite sides of the wheel, so that the U-shaped members will be moved towards or away from each other when the wheel is rotated.

Even after the device is secured onto the screw lid, some people will find it difficult to hold the jar with one hand while rotating the device with the other hand, possibly reducing the efficacy of the device in removing the screw lid. Also, holding the jar with one hand leaves only the other hand free to use the device to remove the screw lid, which may be difficult for some people.

SUMMARY OF VARIOUS EMBODIMENTS

In accordance with one embodiment, a rotating lid opener comprises a base member provided with guides; a shaft rotatably mounted at an inner end in the base member; a handle at the outer end of the shaft for rotating said shaft relative to the base member; a tooth wheel at the inner end of the shaft; two U-shaped members slidably mounted in the guides, each U-shaped member including a lid-gripping jaw, one arm of each U-shaped member having teeth meshing with the teeth of the wheel, the toothed arms being located upon opposite sides of the wheel, so that the U-shaped members will be moved towards or away from each other when the wheel is rotated; and at least one non-slip element on an underside of the base member for engaging with a top of the lid to help prevent rotation of the rotating lid opener about the lid.

In accordance with another embodiment, a device for removing screw lids from containers comprises an elongated base member having guides along the longitudinal edges thereof; a rack mounted in each guide; an arm connected to and spaced from each rack and slidably mounted in the guide which is opposite to the guide carrying the connected rack; a lid-clamping jaw connected to each rack; a toothed wheel supported on the plate and meshing with the spaced racks and adapted to be rotated for moving the jaws and racks in opposite directions so that the jaws will be clamped on the lid; a handle for rotating the toothed wheel until the jaws are clamped on the lid when continued operation of the handle will cause the base member, jaws, and lid to be rotated thereby unscrewing the lid from the container; and at least one non-slip element on an underside of the base member for engaging with a top of the lid to help prevent rotation of the rotating lid opener about the lid.

In various alternative embodiments, at least one non-slip element may be disposed on each guide. Each jaw may have a radius equal to or greater than a largest lid accommodated by the rotating lid opener or may be V-shaped. Each jaw may include a non-slip lid-engaging surface. The lid-engaging portions of the jaws may be configured to extend beyond the width of the base member. The handle may include elongated opposing handle portions configured to allow each handle portion to be grasped by an entire hand to allow for two-handed rotation to remove the lid. Such handle portions may be one-way foldable and may further comprise a handle locking mechanism such as pins to hold the foldable handles in an open/extended position for operating the rotating lid opener to loosen a screw lid from a container.

Importantly, the inventor believes that such embodiments solve a documented, long-felt but heretofore unmet need.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

Figure 1:
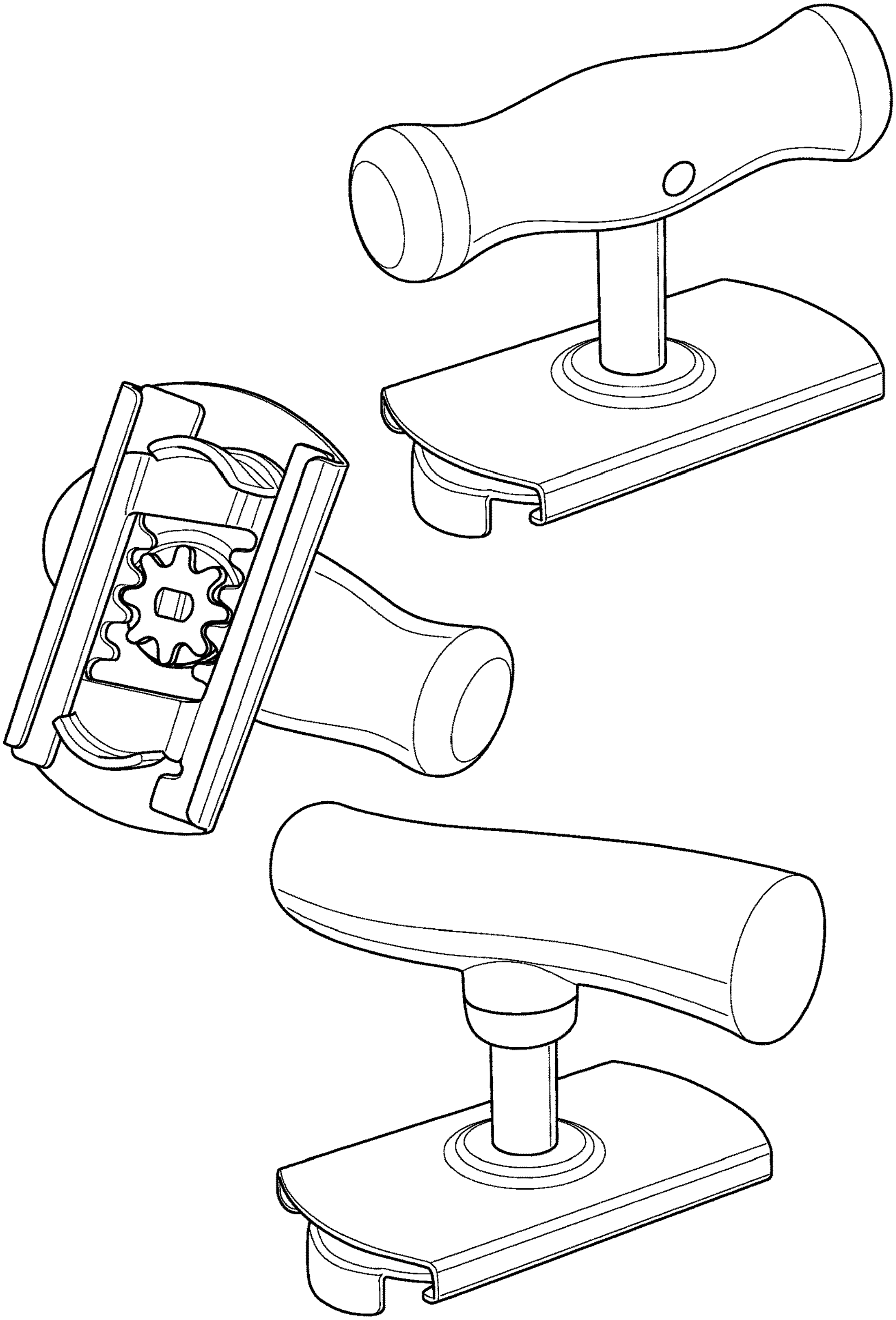
prior art FIG. 1
FIG. 1 shows two devices of the type described in U.S. Pat. No. 1,894,556 that are still available for purchase.
Figure 2:
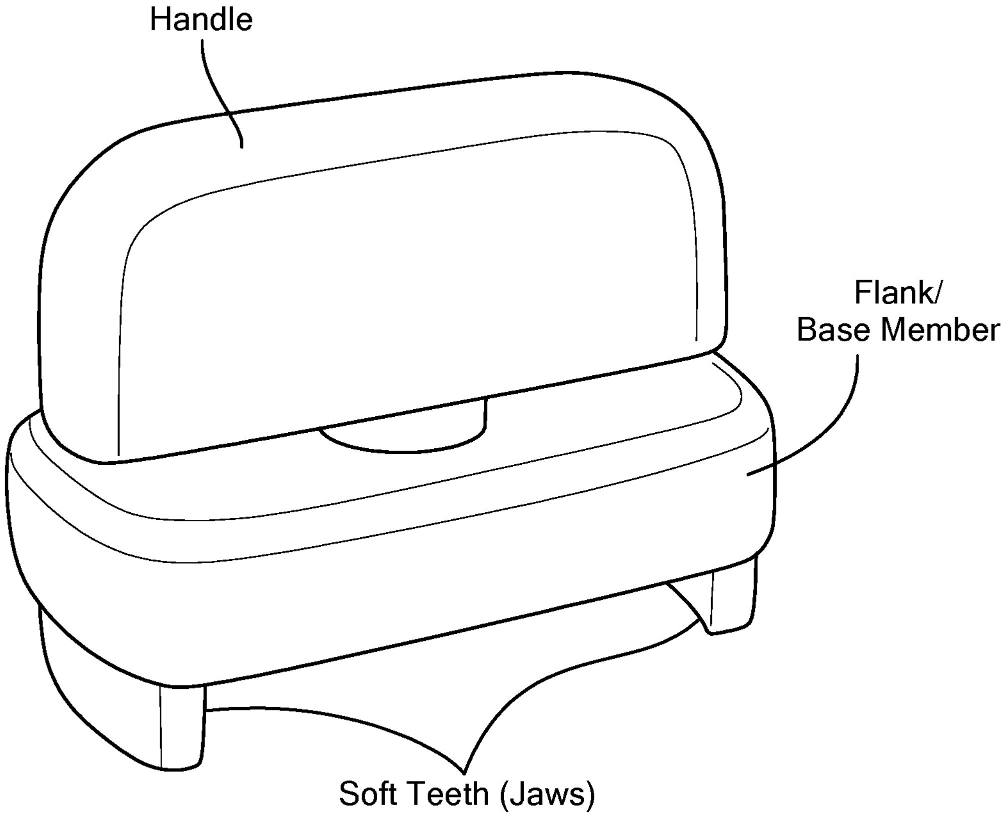
prior art FIG. 2
FIG. 2 shows a similar, but more modern, version of the devices of FIG. 1.

Embodiments relate to various improvements to rotating lid opener devices of the types represented in FIGS. 1 and 2 that can be implemented alone or in any combination.

One known and documented issue with these types of rotating lid opening devices is that the entire device will sometimes rotate about the screw lid as the handle is being rotated, without the clamping jaws sufficiently engaging with the screw lid to allow removal of the screw lid. For example, the device of FIG. 2 is sold with an instruction pamphlet that states "if the [jaws] cannot grab the lid tightly when turning the handle . . . press the flank with your thumb while hold [sic] the handle with your palm and other four fingers to make sure the [jaws] could grab the lid tightly." In other words, when the device rotates rather than locking onto the lid, the user is supposed to hold the device onto the lid while continuing to rotate the handle. The instructions suggest that the user can use the same hand to hold the flank and rotate the handle, which would be very difficult for some people to accomplish, but of course the user could use the other hand to hold the flank while rotating the handle, although use of two hands just to lock the device onto the lid is inconvenient and could be difficult for some people (e.g., because then the jar is not being held).

Figure 3:
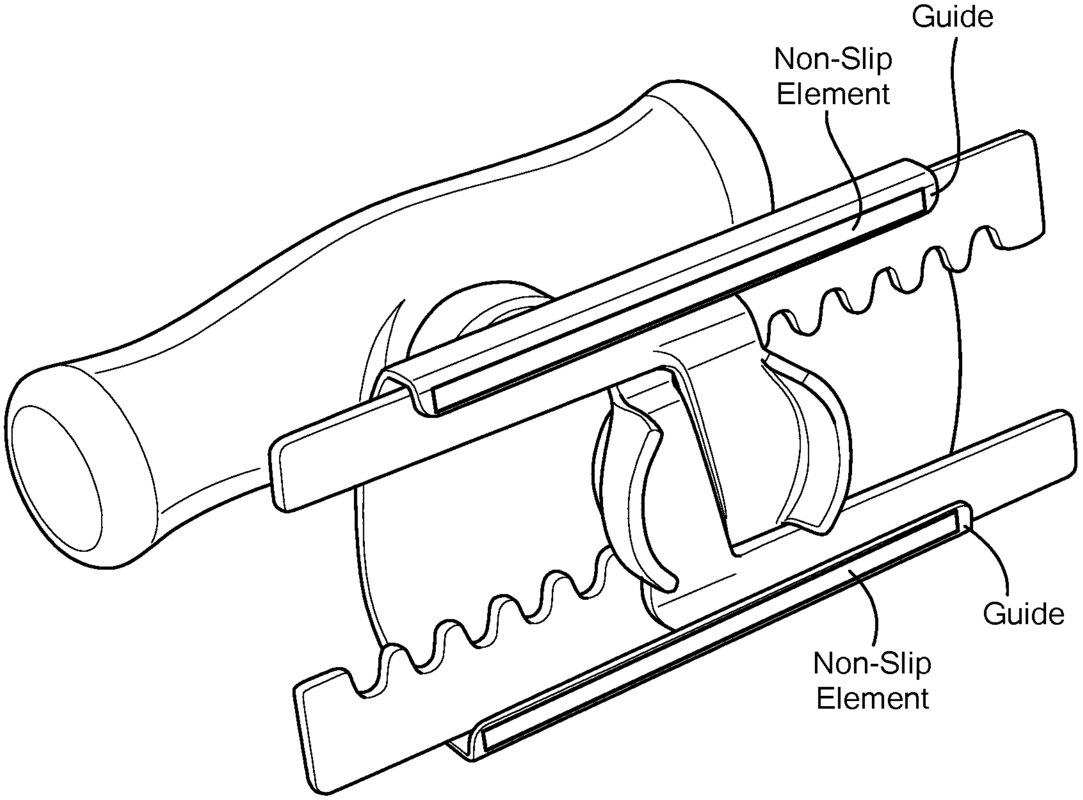
FIG. 3 is a schematic diagram showing non-slip elements (e.g., non-slip pads) included on the underside of the device at locations that will engage with the top surface of the lid, in accordance with certain embodiments.

Therefore, in certain embodiments as depicted schematically in FIG. 3, non-slip elements (e.g., non-slip pads) are included on the underside of the device at locations that will engage with the top surface of the lid (e.g., on the bottom of the guides), thereby providing additional adhesion or friction when the handle is being rotated to reduce the chance of the device rotating without the jaws locking onto the lid. The non-slip elements can be made of any appropriate non-slip material (e.g., rubber, foam, sponge, cork, fabric, plastic, silicone, elastic, adhesive, etc.) and/or be configured to enhance grip (e.g., patterned, coated, etc.). Among other things, these non-slip elements will facilitate one-hand operation of the device. As demonstrated by the instruction pamphlet discussed above, there has been a long-recognized and unmet need for an improved rotating lid opener device that will not rotate as the handle is being rotated. Improvements of the type shown in FIG. 3 help to meet this need.

Another issue with these types of rotating lid opening devices is that the jaws are often of a smaller radius than the lids accommodated by the device and often have sharp edges that can dig into the lid (see, for example, the devices in FIG. 1). In some cases, such jaws can damage or puncture the lid, which can affect potential reuse of the lid.

Figure 4:
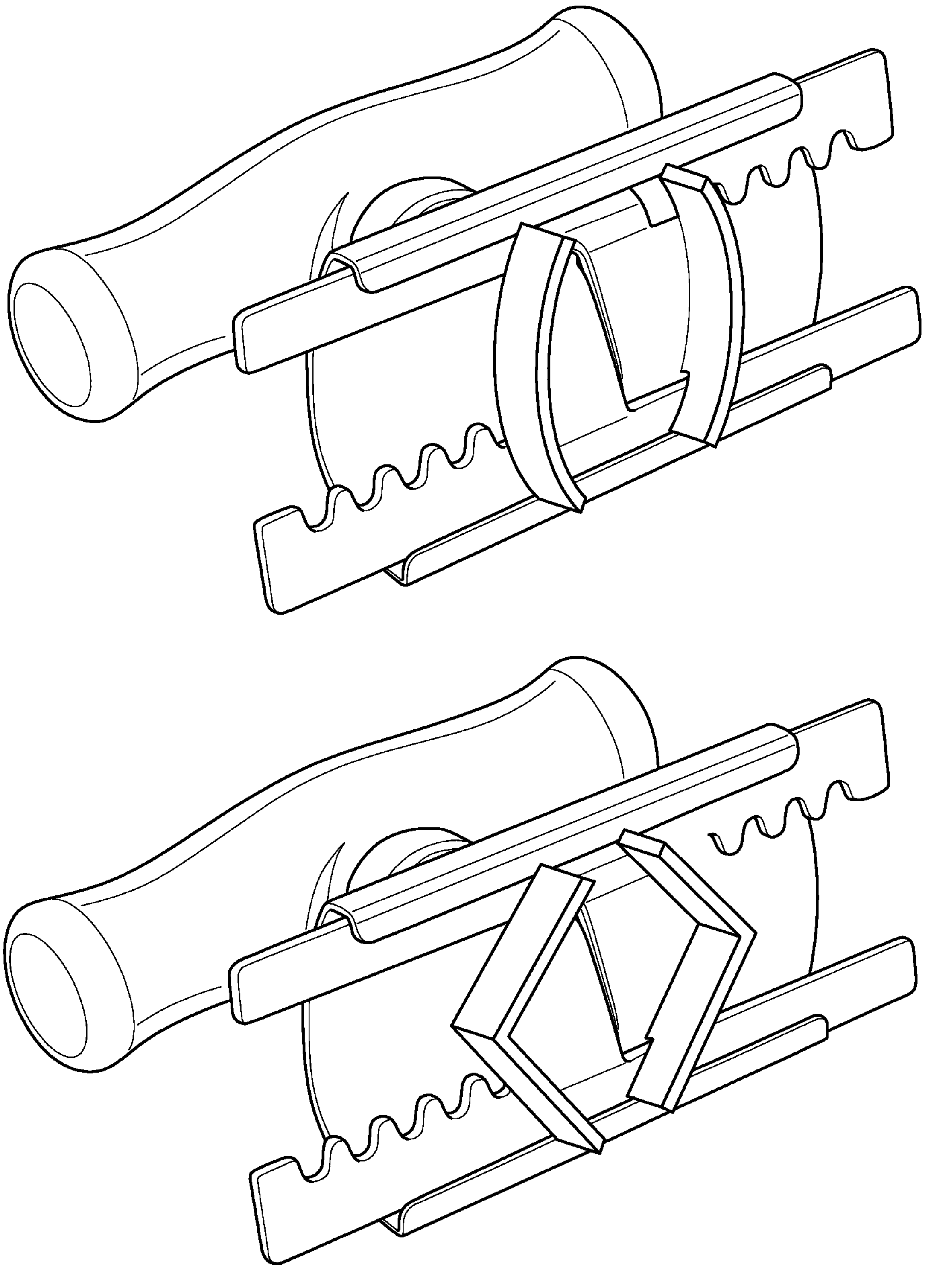
FIG. 4 is a schematic diagram showing jaws configured with a larger radius or non-radius configuration, in accordance with certain embodiments.

Therefore, in certain embodiments as depicted schematically, in FIG. 4, the jaws are configured with a larger radius (e.g., equal to or greater than the largest lid accommodated by the device, e.g., top of FIG. 4) or non-radius configuration (e.g., V-shaped, bottom of FIG. 4) and may be formed of or covered by a padding or non-slip material.

Another issue with these types of rotating lid opening devices is that it is often difficult to see the position and direction of movement of the jaws underneath the device when attempting to engage the jaws to the lid because the jaws are often narrower than the device, in part because the handle is typically rotated counterclockwise to tighten the jaws and clockwise to loosen the jaws (when viewed from the top), which is opposite of how jaw lids and fasteners such as screws are handled (e.g., "righty-tighty, lefty-loosey").

Figure 5:
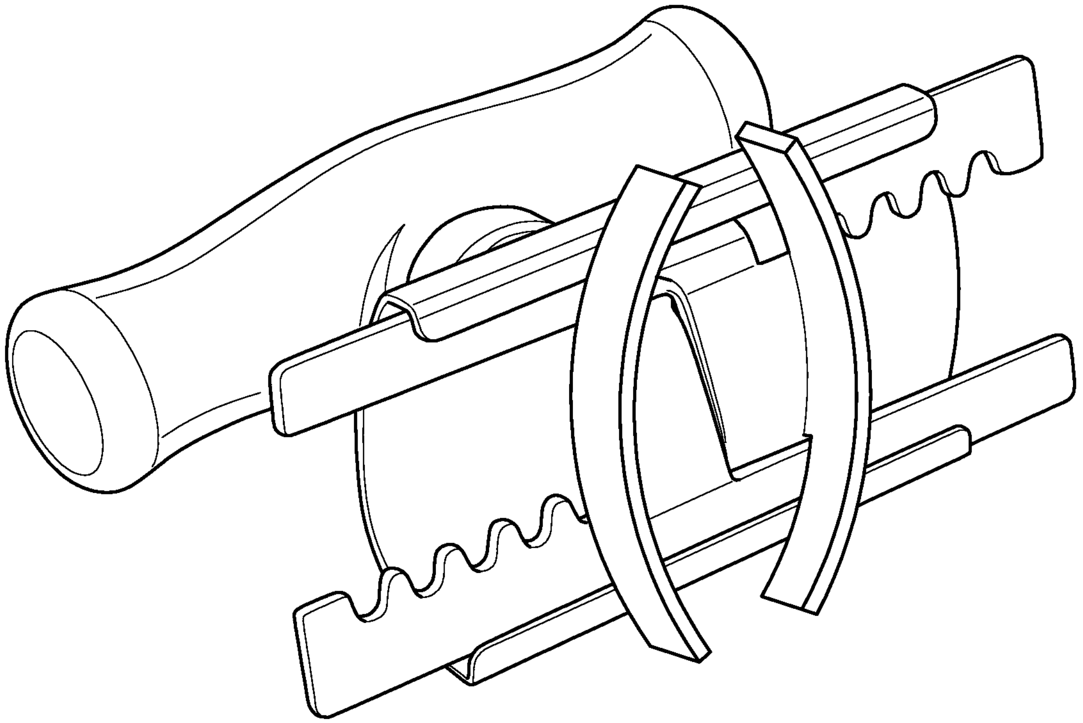
FIG. 5 is a schematic diagram showing the parts of the jaws that engage with the lid configured to extend beyond the width of the flank so that it is easy for the user to see the position and direction of movement of the jaws when attempting to engage the jaws to the lid, in accordance with certain embodiments.

Therefore, in certain embodiments as depicted schematically in FIG. 5, the parts of the jaws that engage with the lid are configured to extend beyond the width of the flank so that it is easy for the user to see the position and direction of movement of the jaws when attempting to engage the jaws to the lid, particularly when the device is viewed from the top.

Figure 6:
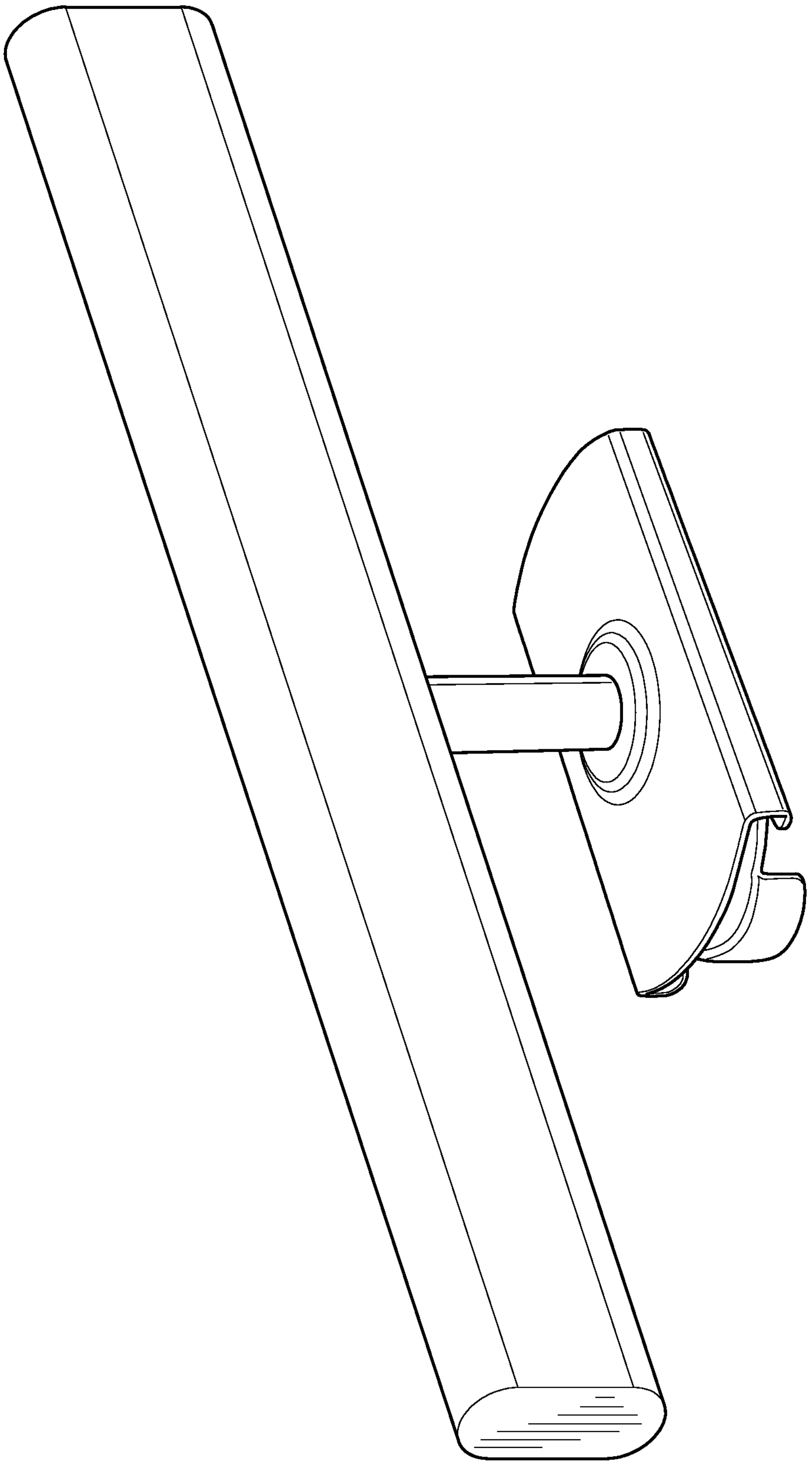
FIG. 6 is a schematic diagram showing a device including longer handle portions in order to facilitate two-handed rotation of the device after the jaws are locked onto the lid, in accordance with certain embodiments.

It should be noted that certain embodiments include longer handle portions as depicted schematically in FIG. 6 in order to facilitate two-handed rotation of the device after the jaws are locked onto the lid, particularly when used in combination with a separate device to hold the container while the screw lid is being removed using the two-handled device, e.g., devices for gripping a container described in U.S. Patent Application Publication No. US 2017/0283231 (now U.S. Pat. No. 10,464,794) or U.S. Patent Application Publication No. US 2017/0284596 or U.S. Patent Application Publication No. US 2021/0087038 (now U.S. Pat. No. 11,472,686), or perhaps even a rubber or other non-slip mat on which the container is placed. Generally, each handle portion (i.e., the portions of the handle on either side of the center post) is elongated to a length that can be grasped by an entire hand, thereby allowing the user to gain a better grip on both handle portions so that the user can use both hands to twist off the screw lid while optionally also pressing downward on the screw lid to further facilitate removal. With two opposing elongated handles, the user can press down evenly and/or unevenly (e.g., rocking back and forth) before, during, and/or after twisting to facilitate loosening of the screw lid. Overall, the inventor expects the elongated-handle device to be much easier to use.

Figure 7:
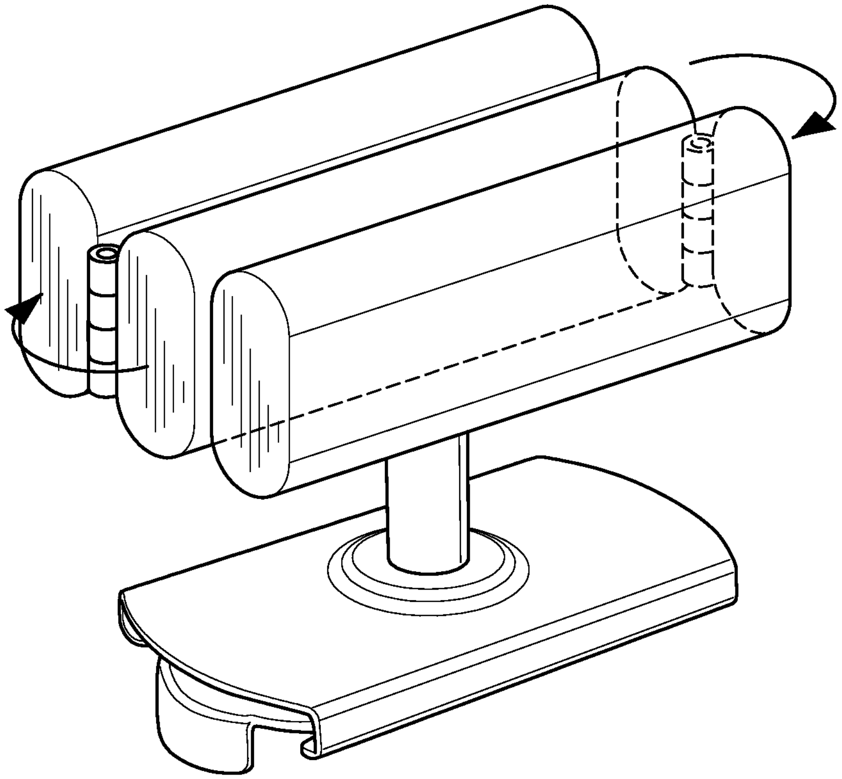
FIG. 7 is a schematic diagram showing an embodiment of FIG. 6 in which the two handle portions of the device may be foldable (and preferably one-way foldable) such as to allow for easier storage of the device such as in a kitchen utensil drawer, in accordance with certain embodiments.

In certain embodiments as depicted schematically in FIG. 7, the two handle portions of the device may be foldable (and preferably one-way foldable) such as to allow for easier storage of the device such as in a kitchen utensil drawer, for example, using a folding handle configuration as described in U.S. Patent Application Publication No. us 2020/0331738 incorporated by reference above. The device is configured so that the handles are held in the open/extended position when the device is being rotated to twist off the screw lid (i.e., in the counterclockwise direction when viewed from the top) but can fold in the opposite direction (i.e., in the clockwise direction when viewed from the top). For example, each foldable handle portion may include a pin that engages with a stop in the fixed handle portion when the handle portions are in the open/extended position, although it should be noted that other locking mechanisms can be used to allow the handle portions to fold in one direction and lock in the open/extended position in the other direction.

It should be noted that improved rotating lid openers containing one or more of the improvements described above could be provided or sold in combination with a container securing device, e.g., devices for gripping a container described in U.S. Patent Application Publication No. US 2017/0283231 (now U.S. Pat. No. 10,464,794) or U.S. Patent Application Publication No. US 2017/0284596 or U.S. Patent Application Publication No. US 2021/0087038 (now U.S. Pat. No. 11,472,686) or perhaps even a rubber or other non-slip mat on which the container is placed, as a kit or product grouping.

Thus, for example, a kit or system may comprise any of the above-described rotating lid openers along with a container securing device, such as a device for gripping a container described in U.S. Patent Application Publication No. US 2017/0283231 (now U.S. Pat. No. 10,464,794) or U.S. Patent Application Publication No. US 2017/0284596 or U.S. Patent Application Publication No. US 2021/0087038 (now U.S. Pat. No. 11,472,686) or a rubber mat.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the “invention” are intended to refer to exemplary embodiments of the invention and should not be construed to refer to all embodiments of the invention unless the context otherwise requires. The described embodiments are to be considered in all respects only as illustrative and not restrictive.

What is claimed is:

1. A rotating lid opener comprising:

a base member having opposed ends and provided with a pair of guides mounted on opposed sides of the base member, with each guide running along a substantial length of its corresponding side, the pair of guides defining, therebetween, a width of the base member, each guide having a channel;

a pinion gear rotatably mounted in the base member between the two ends;

a shaft coupled to the pinion gear and a handle coupled to the shaft to effectuate rotation of the pinion gear, the handle defining a location above the base member when the base member is placed in a utilization position over a lid to be opened;

a pair of opposed rack gears, with each rack gear slidably mounted in a distinct one of the channels and configured to mesh with the pinion gear, wherein the handle can be used to effectuate rotation of the pinion gear so as to cause opposed motion of the two rack gears in their respective channels;

a pair of opposed gripping jaws, each gripping jaw extending in a direction transverse to the length of the base in a manner wherein, after the base member has been placed in the utilization position, a portion of each gripping jaw extends beyond the width of the base so as to render such portion visible to a user gazing at it from above the base member, each gripping jaw mounted to a corresponding one of the rack gears, the gripping jaws being configured to grip a container lid placed between them when the handle is rotated to move the gripping jaws toward one another.

2. The rotating lid opener of claim 1, further comprising:

a set of non-slip elements, the set having at least one member, on an underside of the base member for engaging with a top of the lid to help prevent rotation of the rotating lid opener about the lid.

3. The rotating lid opener of claim 1, wherein at least one non-slip element of the set is disposed on each guide.

4. The rotating lid opener of claim 1, wherein each gripping jaw has a radius at least as large as a maximum radius of any lid to be accommodated by the rotating lid opener.

5. The rotating lid opener of claim 1, wherein each gripping jaw is V-shaped.

6. The rotating lid opener of claim 1, wherein each gripping jaw includes a non-slip lid-engaging surface.

7. The rotating lid opener of claim 1, wherein each gripping jaw is U-shaped.

8. The rotating lid opener of claim 1, wherein the handle includes elongated opposing handle portions configured to allow each handle portion to be grasped by an entire hand to allow for two-handed rotation to remove the lid.

9. The rotating lid opener of claim 8, wherein the handle portions are one-way foldable.

10. The rotating lid opener of claim 9, further comprising a handle locking mechanism to hold the foldable handles in an open/extended position for operating the rotating lid opener to loosen a screw lid from a container.

* * * * *